United States Patent
Jason, Jr. et al.

(10) Patent No.: US 7,131,137 B1
(45) Date of Patent: Oct. 31, 2006

(54) COMMUNICATION SYSTEM INCLUDING A SECURITY SYSTEM

(75) Inventors: James L. Jason, Jr., Hillsboro, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 09/605,361

(22) Filed: Jun. 29, 2000

(51) Int. Cl.
*H04L 9/00* (2006.01)
*H04L 9/32* (2006.01)
*G06F 15/16* (2006.01)

(52) U.S. Cl. .................. 726/1; 726/3; 726/4; 713/151; 709/227

(58) Field of Classification Search ........ 713/150–151, 713/160, 162, 200–202; 709/224, 229, 310, 709/227; 726/1, 3–4
See application file for complete search history.

(56) References Cited

U.S. PATENT DOCUMENTS

| | | | | |
|---|---|---|---|---|
| 5,854,841 A | * | 12/1998 | Nakata et al. | 713/152 |
| 5,987,611 A | * | 11/1999 | Freund | 713/201 |
| 6,253,321 B1 | * | 6/2001 | Nikander et al. | 713/160 |
| 6,347,376 B1 | * | 2/2002 | Attwood et al. | 713/201 |
| 6,519,636 B1 | * | 2/2003 | Engel et al. | 709/223 |
| 6,754,832 B1 | * | 6/2004 | Godwin et al. | 713/201 |

\* cited by examiner

*Primary Examiner*—Emmanuel L. Moise
*Assistant Examiner*—Minh Dieu Nguyen
(74) *Attorney, Agent, or Firm*—Crystal D. Sayles

(57) ABSTRACT

A communication system including a security system, and a method of controlling a communication system. The communication system includes a communication network having a plurality of nodes, a server connected to a first one of the nodes, and a client processor. A magnetic medium within the client processor stores the security system for connecting the client processor to the communication network for communication with the server. The security system includes a transmission control protocol for controlling communication between an application on the client processor and the communication network and a security classifier for coupling the transmission control protocol to the communication network and determining a security classification for the client processor. A security association negotiator is responsive to the client processor opening a socket at a node of the communication network, for correlating the socket with a security association based on the determined security classification. A network interceptor couples the client processor with the transmission control protocol and is responsive to the socket being closed for deleting the security association. In accordance with the method, the completion status of the communication is monitored. Upon completion of the communication, the socket is closed, and in response to closing of the socket, the correlation of the security association with the socket is terminated.

12 Claims, 4 Drawing Sheets

COMMUNICATION SYSTEM INCLUDING A SECURITY SYSTEM

FIELD

The present invention pertains to a security system for connecting a client application to a communication network. More particularly, the present invention relates to controlling the security association on an application on a socket of a communication network.

BACKGROUND

Communication on computer networks is frequently done utilizing secure communication techniques. By way of example, people frequently purchase goods and services over the Internet utilizing secure communications links. Data transferred over such a secure link is described by an Internet Protocol (IP) address, protocol, and ports, and a security association is established using an Internet Protocol Security (IPsec) protocol. The security association continues until it is no longer needed. Generally, an IPsec security association lasts until either a specified amount of traffic has been transmitted using the association or a specified amount of time has passed. These techniques of determining the duration of the security association are sufficient for long-lived security associations that may be renegotiated multiple times. However, a person contacting a web site over the Internet utilizing, for example, a home computer to make a purchase, generally does not visit that web site for an extended period of time before moving on, either by going to another web site or by closing the connection to the Internet. After such a client has left the web site, the IPsec driver for the web site maintains the security association as active. Lifetime management based on the amount of traffic or the amount of time thus results in the security association being maintained for longer than is necessary. One solution to this is for the IPsec driver to periodically remove idle security associations which have not been used to protect any inbound traffic for some predetermined amount of time. However, this may expire security associations that are still in use, for example, by someone merely observing activity on a web site. In any event, this idle detection could be made more efficient and could be done in a more timely manner if the IPsec driver had some context information it could correlate with the security association.

BRIEF DESCRIPTION OF THE DRAWINGS

The features and advantages of the present invention are more apparent from the following detailed description and claims, particularly when considered in conjunction with the accompanying drawing. In the drawings:

DETAILED DESCRIPTION

Figure 1:
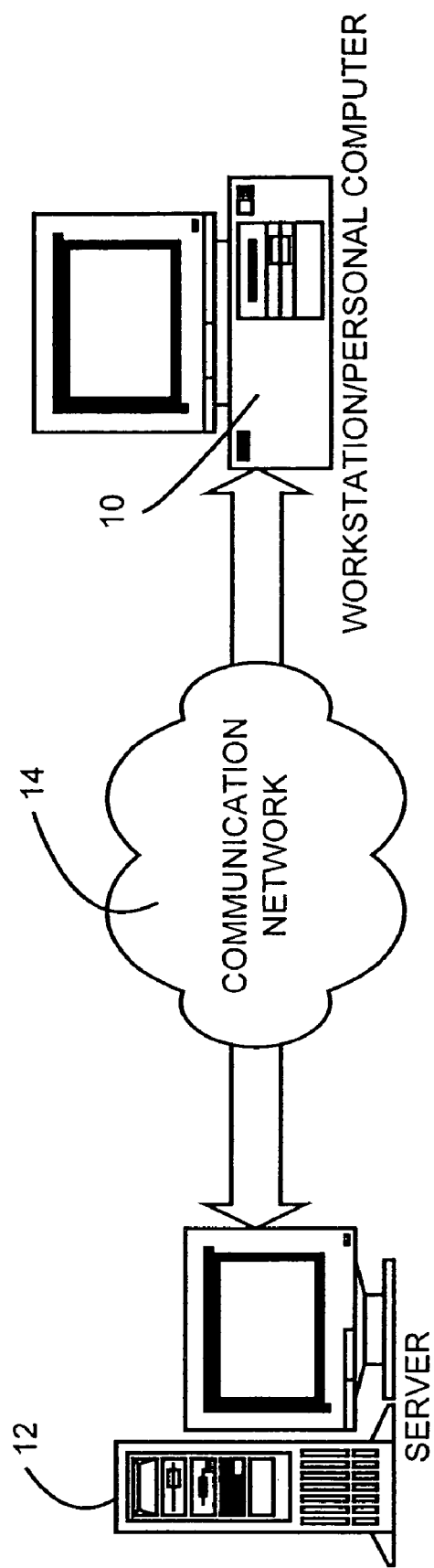
FIG. 1 is a block diagram of a communications system that might utilize a security system in accordance with the present invention.

FIG. 1 depicts a communications system, including a workstation or personal computer 10, which communicates with a server 12 by means of a communication network 14 such as the Internet. In accordance with the present invention, the connection between workstation/personal computer 10 and server 12 might be a secure link on the communication network 14.

Figure 2:
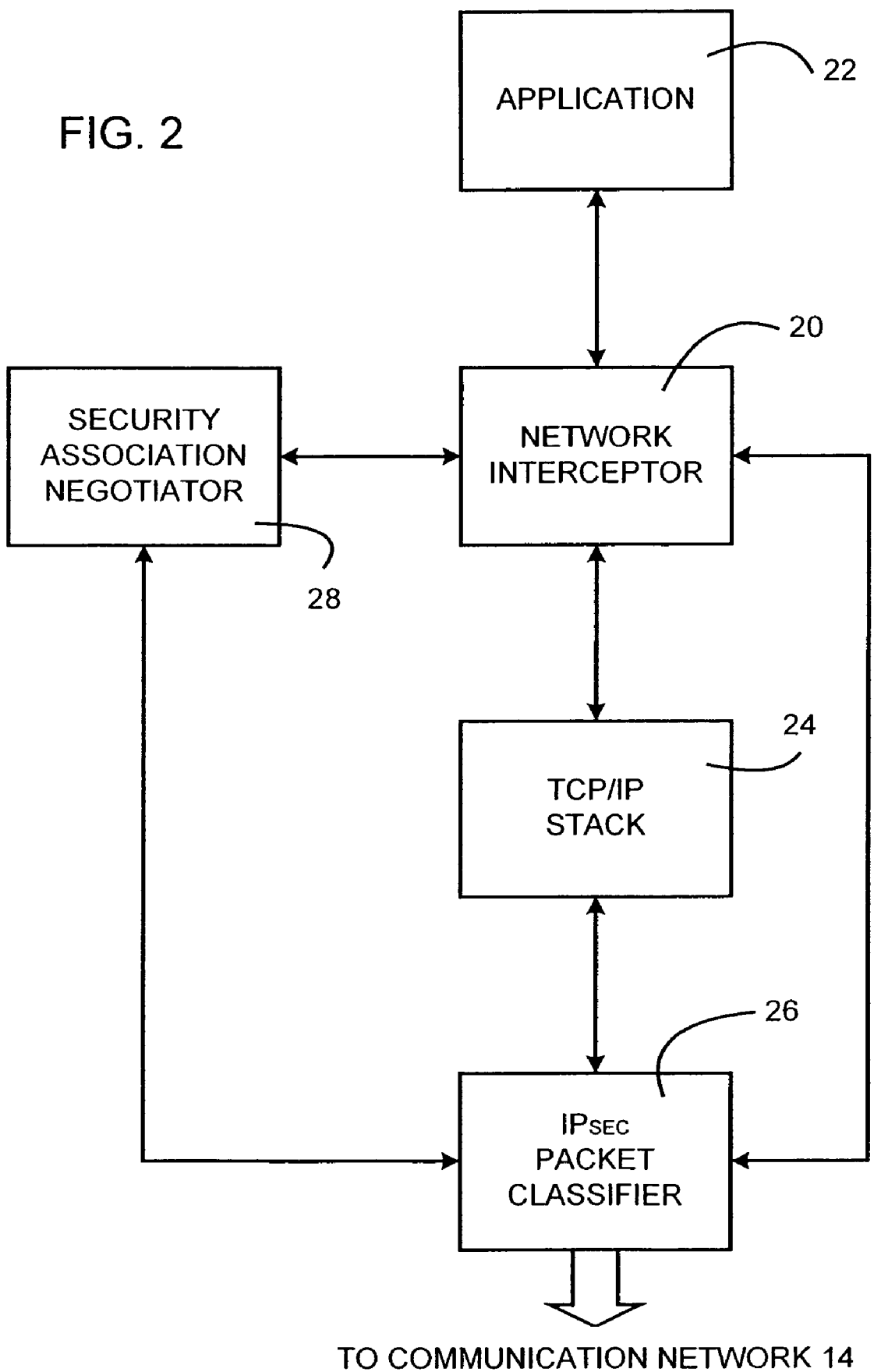
FIG. 2 is a block diagram of a security system for connecting a client to a communication network in accordance with an embodiment of the present invention.

FIG. 2 depicts the security system in accordance with an embodiment of the present invention. Within workstation/personal computer 10, a network interceptor 20 is positioned between an application 22 and a Transmission Control Protocol/Internet Protocol (TCP/IP) stack 24 so as to gather context information. TCP/IP stack 24 is coupled to a communication network, such as network 14, by Internet Protocol security (IPsec) packet classifier 26. IPsec packet classifier 26 is responsible for performing the IPsec processing on incoming and outgoing packets. When application 22 wishes to send or receive data to or from an application on server 12, or to another computer reachable via network 14, application 22 uses a socket on network 14. The position of network interceptor 20 permits the network interceptor to be aware of all socket operations performed by application 22. In particular, network interceptor 20 monitors when application 22 closes the socket.

When IPsec packet classifier 26 detects that a secure communication is desired, it negotiates with a security association negotiator 28 to provide the necessary secure link. Security association negotiator 28 might be the Internet Key Exchange (IKE) negotiator, for example. When a security association is established, security association negotiator 28 notifies network interceptor 20, which assures that the appropriate security association information is available to IPsec packet classifier 26. In addition, network interceptor 20 maintains a reference to the security association on the socket. The security association, of course, is not unique to its particular socket but may apply to all applications between workstation/personal computer 10 and server 12. When additional sockets are created that will be protected by an existing security association, network interceptor 20 monitors this.

Figure 3:
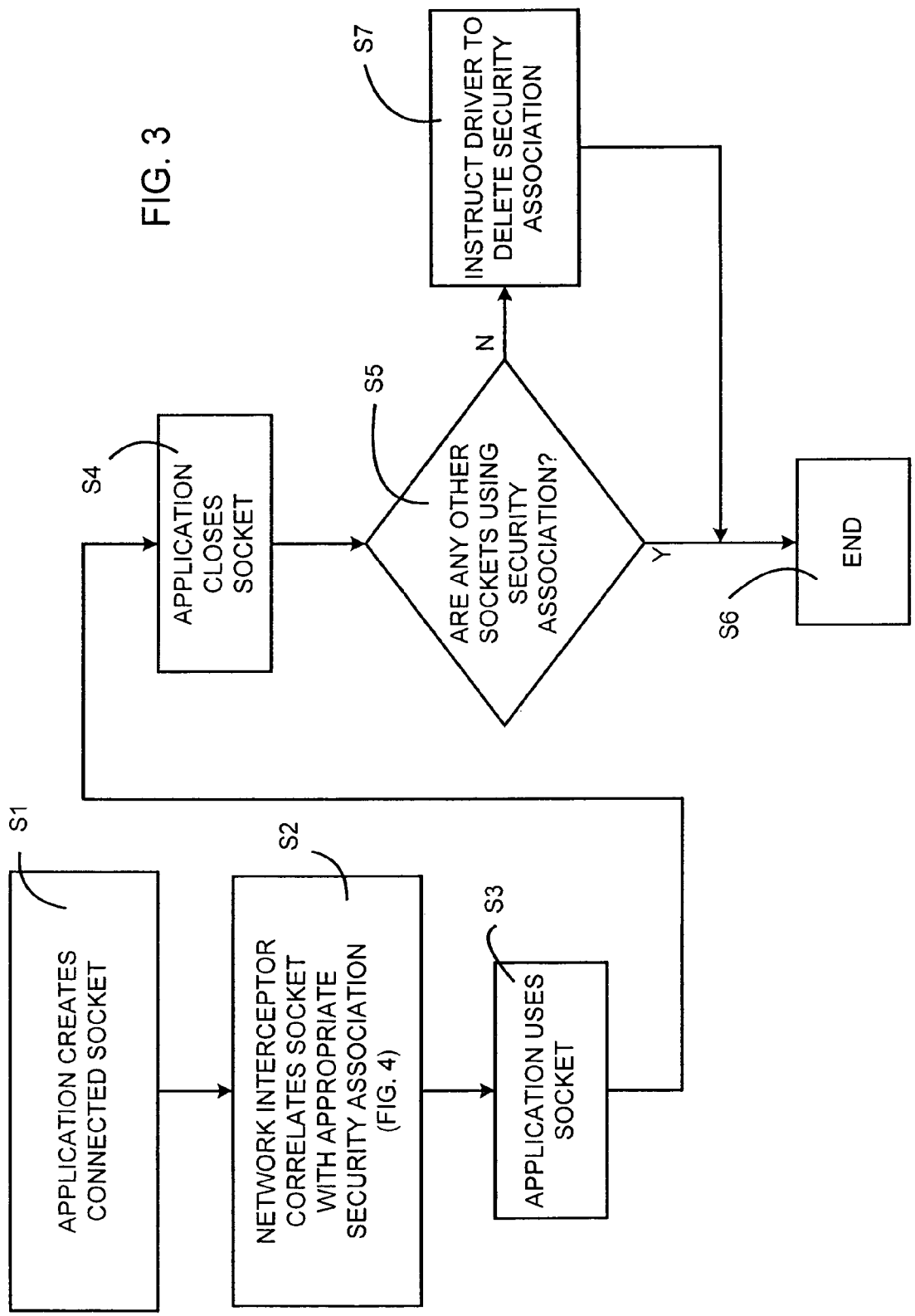
FIG. 3 is a flowchart of a method of controlling applications on a computer network in accordance with an embodiment of the present invention.
Figure 4:
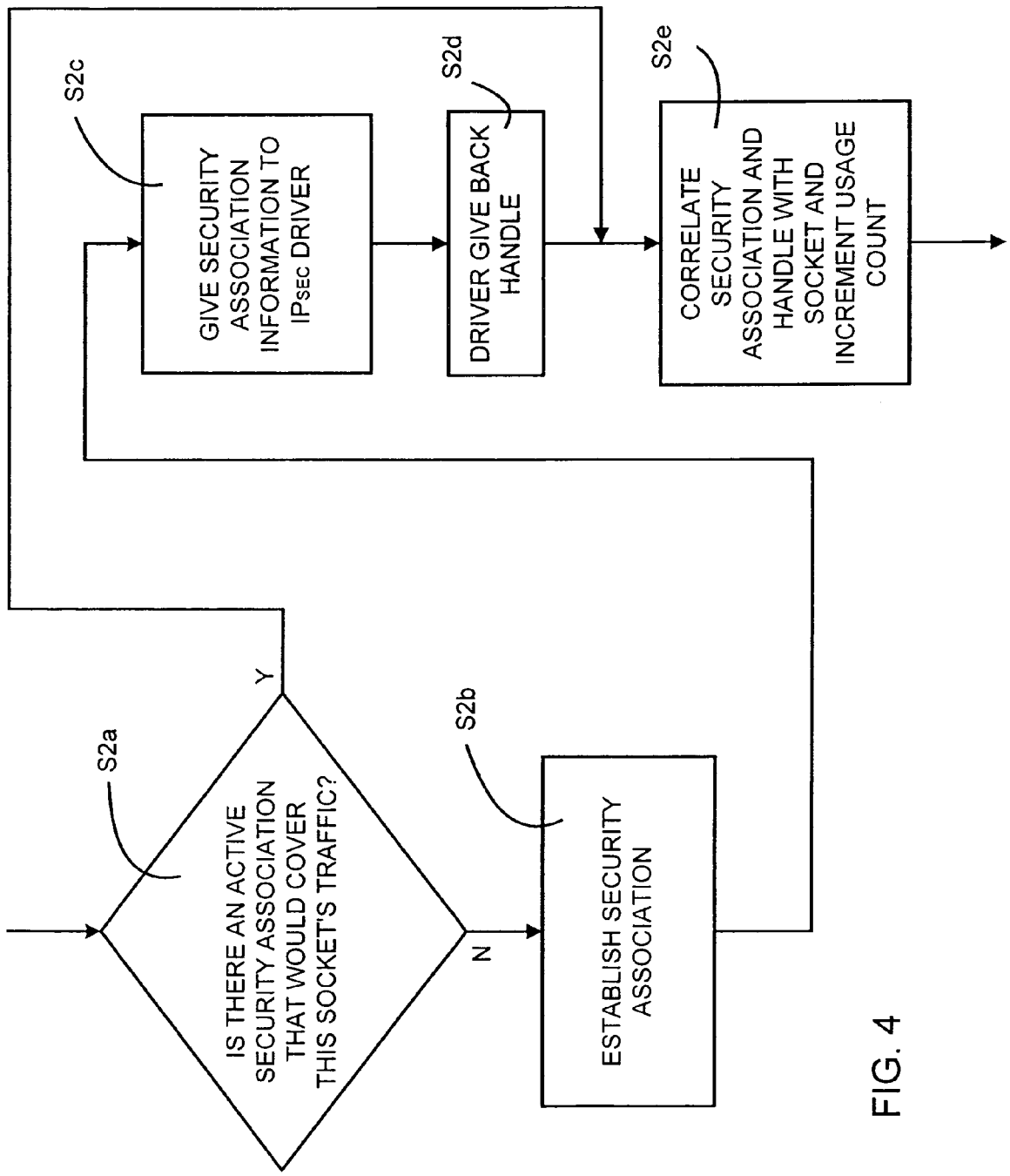
FIG. 4 is a more detailed block diagram of an embodiment of one step in the flow chart of FIG. 3.

FIG. 3 is a flowchart of an embodiment of a method of controlling security on a communication network connecting a server and a client in accordance with the present invention. In a step S1, application 22 creates a connected socket. As a consequence, in step S2, network interceptor 20 correlates the socket with an appropriate security association. FIG. 4 is a detailed flowchart of this step. In FIG. 4, in step S2a, it is determined whether there is an active security association that would cover the traffic of the socket. If not, then in step S2b, a security association is established. In step S2c, the security association information is given to the IPsec packet classifier; and in step S2d, the driver gives back a handle. In step S2e, the security association and handle are correlated with the socket, and the usage count is incremented. In step S2a, if there already exists an active security association that would cover the traffic from the socket, then the flow proceeds directly to step S2e to correlate that security association and handle with the socket and increment the usage count.

Returning to FIG. 3, once the socket is correlated with the appropriate security association in step S2, then the application uses the socket in step S3. When the communication is completed, the application closes the socket in step S4. In step S5, it is determined whether any other sockets are using the security association. If so, then the process ends for the socket of the completed application. However, in step S5, if it is determined that no other sockets are using the security association, then in step S7, the driver is instructed to delete the security association, following which the process ends in step S6.

Accordingly, once no sockets are using the security association, the security association is deleted.

When the last socket for a particular security association is closed, network interceptor 20 can immediately delete the security association so that the IPsec packet classifier will no longer perform IPsec processing on packets which match the security association packet flow parameters. Alternatively, network interceptor 20 can mark the security association as currently no longer needed. Network interceptor 20 will then periodically make a sweep of security associations and delete those that have not been used for some predetermined, configurable time. Thus, for example, when server 12 has fulfilled the client request from workstation/personal computer 10, server 12 closes the socket used to communicate with the workstation/personal computer. When workstation/personal computer 10 makes another request, a new socket is created. If the security association is retained for a small period of time, during which such a new socket is created, that security association can be used, forgoing the security association negotiation of steps S2b, S2c, and S2d in FIG. 4.

By utilizing the present invention, the IPsec driver no longer is required to dedicate a thread to performing the housekeeping function of deleting idle security associations. Security associations may be deleted as soon as they are no longer needed. As a consequence, valuable non-paged memory space is saved in the driver, as it no longer has to retain information of unneeded security associations. Context information associated with the network flow can be used as the determining factor when deleting security associations. Alternatively, other context information could be used. For example, a system may have a set of IP policies it enforces when no user is logged in. A network interceptor at the applications level can monitor log-in of new users and immediately delete security associations as such a new users policy may be different and would require a security association with different security parameters.

The present invention can be implemented in hardware, firmware, or software, and for example, might be maintained in a storage medium such as a magnetic or an optical storage medium, or any other medium capable of storing the invention.

Although the present invention has been described with reference to preferred embodiments, numerous rearrangements, alterations, and substitutions could be made, and still the result would be within the scope of the invention.

We claim:

1. A communication system, comprising:
a communication network, including a plurality of nodes;
a server connected to a first one of the nodes;
a client processor;
a storage medium within the client processor to store a security system for connecting the client processor to the communication network for communication with the server, wherein the security system includes a transmission control protocol to control communication between the client processor and the communication network;
a security classifier to couple the transmission control protocol to the communication network, the security classifier to determine a security classification for the client processor;
a security association negotiator responsive to the client processor opening a socket at a node of the communication network, to correlate the socket with a security association based on the determined security classification; and
a network interceptor to couple the client processor with the transmission control protocol, wherein the network interceptor responds to the socket being closed by determining whether any other socket is correlated with the security association, and if it is determined that no other socket is correlated with the security association, deleting the security association.

2. The communication system of claim 1, wherein the network interceptor monitors all sockets protected by the security association.

3. The communication system of claim 1, wherein the network interceptor monitors when the socket is closed.

4. An article, comprising a storage medium having instructions stored thereon, the instructions when executed, provide for controlling a security association of a network communication between a local application having a socket and a remote application by monitoring a completion status of the communication; upon completion of the communication, closing the socket; and in response to the closing of the socket, determining whether any other socket is correlated with the security association, and if it is determined that no other socket is correlated with the security association, deleting the security association.

5. An article as claimed in claim 4, wherein the local application operates through a driver, and the correlation of the security association with the socket includes notifying the driver that the security association is no longer needed, to cause the driver to terminate the correlation.

6. A communication method comprising:
monitoring a completion status of a network communication between a local application and a remote application, wherein the local application utilizes a socket correlated with a security association;
upon completion of the network communication, closing the socket; and
in response to the closing of the socket, determining whether any other socket is correlated with the security association, and if it is determined that no other socket is correlated with the security association, deleting the security association.

7. The communication method of claim 6, wherein the local application operates through a driver, and terminating the correlation of the security association with the socket includes notifying the driver that the security association is no longer needed to cause the driver to terminate the correlation.

8. A communication method comprising:
creating a socket for a local application to enable the local application to communicate with a remote application on a communication network;
correlating the socket with a security association;
performing the communication through the socket and the communication network;
upon completion of the communication, closing the socket; and
in response to the closing of the socket, determining whether any other socket is correlated with the security association, and if it is determined that no other socket is correlated with the security association, deleting the security association.

9. The communication method of claim 8, wherein correlating the socket with the security association comprises:

determining whether there is an active security association that would cover traffic for the socket;

if it is determined that there is an active security association that would cover traffic for the socket, then correlating the socket with the active security association;

if it is determined that there is not an active security association that would cover traffic for the socket, then:

determining a new security association for traffic for the socket;

giving the new security association to a network security driver;

receiving a handle for the new security association from the network security driver; and correlating the socket with the new security association of the handle.

10. The communication method of claim 8, wherein the local application operates through a driver, and terminating the correlation of the security association with the socket includes notifying the driver that the security association is no longer needed to cause the driver to terminate the correlation.

11. A security system comprising:

a transmission control protocol for controlling communication between a client application and a communication network;

a security classifier for coupling the transmission control protocol to the communication network, the security classifier to determine a security classification for the client application;

a security association negotiator responsive to the client application opening a socket at a node of the communication network, to correlate the socket with a security association based on the determined security classification; and a network interceptor coupling the client application with the transmission control protocol, and responsive to the socket being closed by determining whether any other socket is correlated with the security association, and if it is determined that no other socket is correlated with the security association, to delete the security association.

12. The security system of claim 11, wherein the network interceptor monitors when the client application closes the socket.

* * * * *